United States Patent [19]

Müller et al.

[11] 4,298,791

[45] Nov. 3, 1981

[54] SCANNING DEVICE FOR PRESELECTOR COUNTER MECHANISM

[75] Inventors: Helmuth Müller, St. Georgen; Lother Herrmann, Hornberg, both of Fed. Rep. of Germany

[73] Assignee: Kienzle Apparate GmbH, Villingen, Fed. Rep. of Germany

[21] Appl. No.: 182,805

[22] Filed: Aug. 29, 1980

[30] Foreign Application Priority Data

Sep. 22, 1979 [DE] Fed. Rep. of Germany ....... 2938410

[51] Int. Cl.³ .............................................. G06F 15/18

[52] U.S. Cl. ................................ 235/132 R; 235/134

[58] Field of Search ........................ 235/132 R-132 E, 235/134, 144 D

[56] References Cited

U.S. PATENT DOCUMENTS

| | | | |
|---|---|---|---|
| 2,645,426 | 7/1953 | Sansome | 235/132 R |
| 3,115,301 | 12/1963 | Renner | 235/132 R |
| 3,482,774 | 12/1969 | Muller et al. | 235/132 R |
| 4,180,202 | 12/1979 | Smilgys | 235/132 R |

*Primary Examiner*—Donald A. Griffin
*Assistant Examiner*—Benjamin R. Fuller
*Attorney, Agent, or Firm*—Toren, McGeady & Stanger

[57] ABSTRACT

Apparatus for scanning the relative position of a preselector counter mechanism which includes a plurality of digital discs having radial cams rotated in accordance with the setting of a preselected numerical value on the counter, with each of the radial cams being provided with a scanning arm adapted to initiate a switching operation upon reaching a preselected stage of the counter mechanism, is provided with a plurality of counter wheels each adapted to be set to a pre-selected value with an analogue metering value cam in the shape of an Archimedean spiral being affixed to each of the counter wheels. Each of the counter wheels and the metering value cams is arranged to represent a decade of a decimal system numerical value. Indexing pinions gear each of the counter wheels and the metering value cams with those representing a next adjacent decade. Multiarmed spring actuated swivel levers scan the metering value cam in sequence by decades after release from a ready position from a higher decade to a next lower decade. The device operates a switching shaft which is connected to control a valve or similar mechanism and the switching shaft is formed with stepped levers interacting with the swivel levers. The swivel levers include an extension arm operating as a scanning arm for scanning the metering value cams and with another extension arm provided with functional plateaus for effecting release by decades of the swivel levers into the scanning position, with the other extension arm operating to release the stepped levers for effecting a stepped control function of the switching shaft.

7 Claims, 6 Drawing Figures

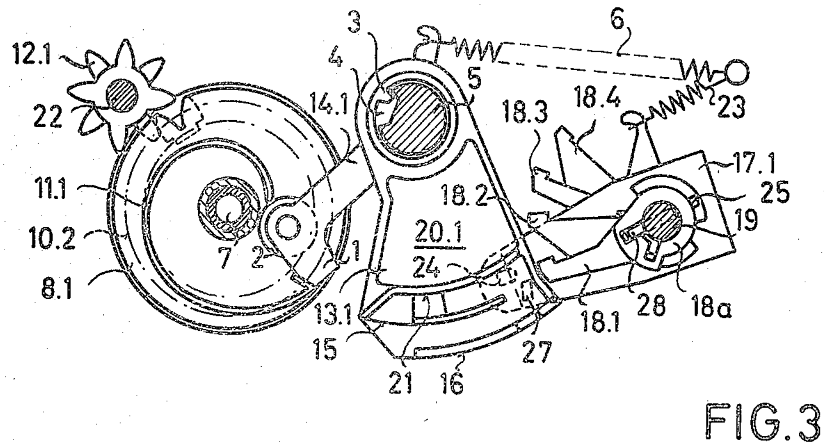
FIG.3
FIG.2
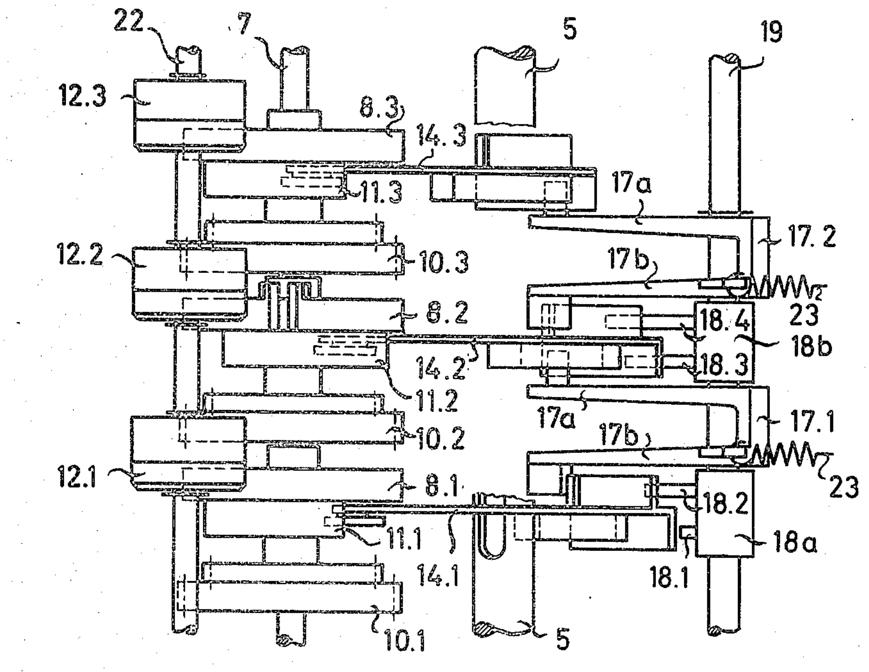

SCANNING DEVICE FOR PRESELECTOR COUNTER MECHANISM

The present invention relates to apparatus including a preselector counter mechanism wherein a numerical value may be set whereby, for example, fluid flow control may be effected by closing a valve after the set amount of fluid has been dispensed.

More particularly, the device of the invention operates to scan the preselector mechanism and to effect a control function based upon the preselected numerical value set therein.

The scanning device of the present invention includes several number wheels provided with radial cams, with the radial cams being turned in correspondence with the setting of the preselected number. Each radial cam is formed with a swivel scanning arm which upon reaching a predetermined meter count initiates a switching off operation.

Preselectable meter counters of the type described above, in general, serve the purpose of being capable of enabling setting of a desired amount which may be expressed in a numerical value in the meter counter. Interaction with a metering device and a switching device enables achievement of an automatic shutoff when the preselected pre-dialed amount has been obtained. The switching-off or shutoff effect is usually initiated by means of sensing levers or scanners which fall into a switching position depending upon the position of the number wheels or the position of the coordinated radial cams, respectively. With the sensor or scanning levers swinging into position, the shutoff process is finally initiated and it may be accomplished in one or several shutoff steps.

Mechanical preselectors of the type described herein usually require that the sensing or scanning levers which scan the radial cams of the number wheels abut against the control cams with as little force as possible. Nevertheless, the contact pressure must be sufficiently great to insure functional reliability. Contact pressures which insure safe switching operation may be required to reach substantially high levels and may give rise to considerable resistance to the drive mechanism of the number wheels and to the overall measuring device itself. Excessive torsional loads on the measuring device driving the preselector mechanism will however cause inaccurate measurements.

In most practical devices presently known, the torque which is required for controlling the switching operation tends to be far greater than the maximum permissible torque acting through the scanning levers onto the drive mechanism of the preselector counter mechanism, that is on the measuring device itself. It has been attempted with known types of preselector counters, for example as disclosed in German Pat. No. 1,260,835, to interpose, between the shutoff elements and the sensing levers of the preselector meter counter, means which are designed to separate to the degree possible the considerable switching and torsional forces which emanate respectively from the switching device, in order to isolate these forces from the existing composition of forces at the sensing levers. This separation may be achieved by providing a stop-motion lever controlled by the scanning or sensing levers whereby a stepped segment will abut against the stop motion lever so that the stepped segment will be under the influence of the shutoff torque. The force acting upon the stop-motion lever from the stepped segment is absorbed by the lever's bearing thus eliminating any torque on the stop motion lever as a result of the effect of the switching force. The sensing torque of the sensor levers is generated by a spring provided especially for this purpose whereby the spring acts upon the sensing lever. The spring finally releases the stop-motion lever in steps depending upon the sensing or scanning position and through the stop motion lever, the shutoff mechanism is activated.

The known device previously described will cease to be in a position to fulfill the requirements of a slight torsional load of the preselector counter, or the measuring device driving the latter respectively, when considerable forces become active between the stepped segment and the stop-motion lever which forces will appear in the form of increased frictional resistance. In order to overcome such increased frictional resistance, reinforced springs will be required for the sensing levers which, in turn, will then increase the sensing pressure on the cams of the number wheels.

An obvious measure to overcome this problem, namely the interposition of reduction gearing between the source of the switching force and the stepped lever, is not practicable for several reasons. On the one hand, such intermediate reduction gearing will involve considerable expenditures with regard to space and material thus being unacceptable for metering devices of the type involved. Accordingly, it is difficult to propose a single solution which will be applicable in all instances especially for switches of a design where the controlling switching forces are located substantial distances apart.

In German Pat. No. 1,260,835 a support lever having ladder-like supporting platform is arranged between the switching mechanism and the stop-motion lever of the unit in order to enable control of the switching forces of varying magnitudes in the switching mechanism. The switching forces emanating from the switching mechanism are applied on the supporting platforms or steps of the support lever. An additional torque generated by a compensatory spring reacts against the action of this force which has already been reduced as indicated above.

Furthermore, in the solution described above, there is no capability for meeting all of the requirements for a single unit and for all practically feasible configurations of forces because with these solutions in specific cases an adaptation of the counter-torsional force by means of compensating springs of varying strengths and modifications on the active lever arms must be made.

Another device for sensing the positions of number wheels of a preselected counter is known from German Pat. No. 1,574,004. In order to avoid the effects of a strong switching force on all the numbered wheels of the preselector counter, the sensing levers which usually act together are separated insofar as the gearing is concerned. In order to reduce the effects which inhibit the drive of the device simultaneously on all sensing levers, the sensing levers of the higher decade operate upon reaching a switching position to first control a stop-motion lever which maintains the sensing levers of the lower decades off the radial cams temporarily. When a certain counting position has been reached, the stop-motion lever will release the residual sensing levers to contact position. The torque of one switching spring is transmitted in a power reducing manner onto the sensing levers for higher decades. As a result, the sensing levers of the higher decades rest on the radial cams of the coordinated number wheels with considerably less pressure. During release of the sensing levers for the lower decades into their sensing position however the full force of the switching spring comes into play.

The solution discussed above however provides only a partial answer for the drive configuration of the preselector meter in the higher decades since it does not offer a solution for the reduction of the drive inhibiting sensing and switching forces acting on the number wheels.

Accordingly, the present invention is directed to provision of a sensing device for a preselector meter counter for controlling the switching forces whose magnitude is significant whereby the effectiveness of the sensing and switching forces will be controlled in accordance with the counter position and whereby a retroactively drive-inhibiting influence of the sensing and switching forces is avoided.

SUMMARY OF THE INVENTION

Briefly, the present invention may be described as apparatus for scanning the relative position of a preselector counter mechanism which includes a plurality of digital discs having radial cams which are rotated in accordance with the setting of a preselected numerical value on the counter, each of the radial cams being provided with a scanning arm adapted to initiate a switching operation upon reaching a preselected state of the counter mechanism. The apparatus comprises a plurality of counter wheels each adapted to be set to a preselected value, an analogue metering value cam in the shape of an Archimedean spiral affixed to each of the counter wheels, each of the counter wheels and metering value cams being arranged to represent a decade of a decimal system numerical value, indexing pinion means gearing each of the counter wheel and metering value cam with those representing a next adjacent decade, multiarmed spring actuated swivel levers for scanning the metering value cams by decades and in sequence after release from a ready position from a higher decade to a next lower decade, and a switching shaft having stepped levers thereon interacting with the swivel levers. The swivel levers have an extension arm operating as a scanning arm for scanning the metering value cams and another extension arm provided with functional plateaus for effecting release by decades of the swivel lever into the scanning position, said another extension arm operating to release the stepped levers for effecting a stepped control function of the switching shaft.

Thus, the present invention provides a solution to the problems arising in the prior art in that on each number wheel which may be set to a preselected value, a torsionally rigid analogue counting value curve or cam in the form of an Archimedean spiral is provided. The number wheel and counting value cam are connected to the next decade by means of gearing and the spring loaded multiarm swivel levers scan the counting value cams in sequence after release from a higher decade to a next lower decade. One of the extension arms of the swivel levers is formed as a scanning or contact arm for scanning of the counter curve. Said another extension arm of the swivel levers is provided with several functional plateaus which serve for a release by decades of the swivel arms into the sensing positions and finally for release of stepped levers for the stepwise control of the shutoff shaft.

The interaction of the swivel arms with the bridge-like levers between the decades proceeds in such a fashion that every time a swivel arm in one decade is shifted from a ready position to any position deviated from the valency position "0" for the purpose of sensing, one of the functional plateaus of the swivel arm will swing into the sensing range of the coordinated bridge-like lever. The lever, which is subsequently freely controlled and spring-powered, is held in a position which is in turn maintained in a specified functional plateau. In that given position, a stop provided at the other leg of the lever moves into the path of travel in front of the functional plateau of the swivel arm of the next lower decade and thus prevents it from swinging into scanning position. This reaction is continued in an advantageous manner through all the decades inclusive of the lowest values. The highest preselection decade set to a value not equaling "0" thus controls by its swivel arm all the swivel arms of the lower decades by means of the levers as connecting intermediate links and into a locked position from where they are subsequently released, decade by decade, into the proper sensing positions.

Thus, in a very advantageous manner, there will always only be one swivel arm in abutment against a counter cam, namely on that counter cam of the decade set to the highest amount.

Accordingly, all of the number wheels of the lower decades will be relieved of friction caused by the sensing levers and there will be created no brake stress on the drive mechanism. The disconnecting forces act retroactively upon the shutoff shaft and have no effect on the number wheels because the forces will be acting in a radial direction on the functional plateaus and thus on the axis of the swivel arms and will be maintained completely apart from any action of the counter cam until the switching phase sets in. As a consequence of the radial direction of action there is no torque acting on the swivel arms so that even during the sensing phase there will be no load factor acting upon the number wheels.

The action of the spring-powered swivel arms on the counter cams may be considered as a drive component since each counter cam, taken in the direction of rotation and during the sensing phase, will have a tendency to move toward the bearing axis since it will represent a curve descending toward the bearing axis. The spring-powered swivel arm, when pressing against the Archimedean spiral, acts as a driving force with a component of force and thus compensates at least for the friction loss caused through the downward pressure. The drive will not be stressed in any way and on the contrary each individual number wheel will be given a drive torque during the sensing phase due to the downward pressure of the swivel arm onto the receding counter curve, whereby the drive torque results from the downward pressure and whereby inevitable friction losses will be compensated.

Control of the individual swivel arms is effected in an advantageous manner by bridge-like levers which are rotatably mounted on the shut-off or switching shaft which is spring powered. If the swivel arm of the highest decade of a preselected multidigit number senses a value which does not equal "0", the extension arm acting in cooperation with the swivel arm of the lever will be deposited onto one of the functional plateaus designated a central functional plateau. During this functional phase, a stop member will position itself in front of the next or other functional plateau of the next lower decade and will prohibit swinging inside of the swivel arm into the sensing position until such time as the value position of the sensed counter cam reaches a value of "0".

When the position "0" has been attained, the lever which is released by the ledge of the central functional plateau lifts off thus lifting the lock position for the swivel arm of the next lower decade and thus releasing the swivel arm in question to the sensing position on the counter cam of the next lower decade. This sequence will be repeated until finally the swivel arm for the lowest decade has been released into sensing position. The decided advantage with an arrangement of this type resides in the fact that one swivel arm only will always rest on a counter cam of the highest decade to be sensed. Because of this condition and due to the drive momentum generated during the sensing process, there will be no retroactive load or stress on the preselector counter-mechanism.

Simultaneous with the sensing of the counter cams, the stepped levers for the step-wise activation of the shut-off shaft are controlled by means of the ledges of the peripheral functional plateaus. The stepped levers are mounted in a torsion-proof manner on the shut-off shaft and have, for example, two switching arms axially off set in the direction of rotation. With the aforesaid arrangement it is possible without extra measures to control the switching shaft within one decade and in two switching steps. The arrangement of the switching position within the decade may be selectively determined between the positions from "9" through "0". For this purpose, and in an advantageous manner, the ledge of the outer functional plane or plateau may be shortened by removing material therefrom in an amount corresponding to an arc length such that with the remaining ledge portion practically any value which may be scanned between "9" and "0" can be set. When using one stepped lever with two axially offset switching arms in the range of the lowest decades, the shut-off shaft of, for example, one valve can be controlled by means of four different steps and brought thereby into closing position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 2 is a top view of the device which includes the parts depicted in accordance with FIGS. 1*a* through 1*c* with the three lowest decades of the preselectable numerical value cams; and FIG. 3 is a schematic lateral view of the arrangement shown in FIG. 1*a* in the switch-off position.

DETAILED DESCRIPTION OF PREFERRED EMBODIMENT

Figure 1D:
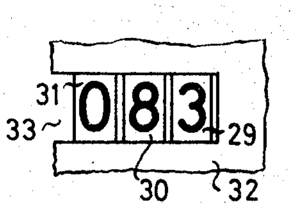
FIG. 1*d* is a partial view of a display unit limited to three decades for setting a numerical value such as "83" which has been preselected.
Figure 1A:
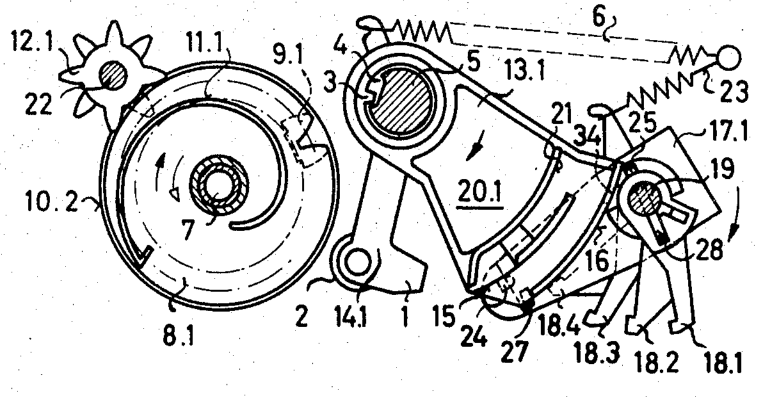
FIG. 1*a* is a schematic lateral view of a portion of the apparatus of the invention corresponding to the units decade of the numerical value to be processed.

Referring now to the drawing wherein similar parts are identified with like numerals throughout the various figures thereof, an embodiment of the invention is depicted in FIGS. 1–3 wherein all of the parts of a preselector counter mechanism, for example the entire switching system, which are not absolutely necessary for a full and complete understanding of the invention have been omitted. Thus, it is known that for a preselection in preselected counters, as for example disclosed in German Offenlegungsschrift No. 22 47 127, a push button or key may be arranged for each individual number wheel. Whenever the key or button is actuated, the number wheel will be shifted through an angle 36° which will correspond with a sequential switching operation by one numerical unit. Additionally, certain devices secure adjustment to a number position displaying a whole number and fix the preadjusted number wheel in this position. The numerical value set on the displaying number wheel is finally transmitted by decades through gears which are individually controlled by an adjustable number wheel.

With reference to the drawings, it will be seen that the apparatus depicted therein includes a plurality of such number wheels 10.1, 10.2, 10.3, each of which is mounted in a torsionally rigid manner upon an analogous numerical value cam 11.1, 11.2, 11.3.

In the embodiment depicted in FIGS. 1–3, the numerical value cam 11.1, 11.2, 11.3 is in the form of an Archimedean spiral. In order to effect switching from one decade to a next higher decade, as known from the range of counters, a switching cam or control cam 9.1, 9.2, 9.3 is provided on a control cam disc 8.1, 8.2, 8.3 whereby the disc by means of a switching pinion 12.1, 12.2, 12.3 on an axle 22 will be engaged with the number wheel 10.1, 10.2, 10.3 of the next higher decade. As will be seen from the embodiment depicted in FIG. 2, the arrangement shown comprises three decades for one preselector counter each, with the apparatus shown in sections whereby the numerical value cam 11.1 is assigned to units of one (FIG. 1A), the cam 11.2 is assigned for units of ten (FIG. 1B), and the cam 11.3 is assigned to the decade for units of hundreds (FIG. 1C).

The number wheel 10.1, 10.2, 10.3, the counter cam 11.1, 11.2, 11.3 and the cam disc 8.1, 8.2, 8.3 together form in each case a torsionally rigid and twist-proof unit for one decade and they are rotationally mounted on an axle 7 which is in turn mounted in the sidewalls of the preselector counter (not shown). The numerical value cam 11.1, 11.2, 11.3 in accordance with the embodiment of FIGS. 1–3 is formed as an axially protruding ledge and is connected in a unitary manner with the control cam plate 8.1, 8.2, 8.3. The setting of the preselected number is affected by rotating the numerical value cams 11.1, 11.2, 11.3 in a clockwise direction. During the sensing process however these cams are driven in a counterclockwise direction. In the embodiment according to FIGS. 1–3 the numerical value cam 11.1, 11.2, 11.3 approaches the axle 7 in accordance with the principles of an Archimedean spiral in the clockwise direction. This process analogously corresponds with the positions to be sensed of the numbers "9" through "0".

In order to effect scanning of a numerical value cam 11.1, 11.2, 11.3 multiple-arm swivel levers 13.1, 13.2, 13.3 have been provided each of which is powered by a tension spring 6. The swivel arms 13.1, 13.2, 13.3 may be swiveled about a specific angle upon a shaft 5 upon which they are mounted whereby the shaft 5 is controlled to a specific angular position by means of a lever (not shown) and a cam.

On the shaft 5 there is provided a slot 4 into which there extends an engaging cam 3 arranged on the swivel levers 13.1, 13.2, 13.3. By rotating the shaft 5 in a counterclockwise direction, all of the swivel levers 13.1, 13.2, 13.3 can be diverted together from the one extreme position corresponding to the Zero-value-scanning, into the other extreme position corresponding to the initial ready position for a value scanning of the digital positions "9" through "0".

The multiarm swivel levers 13.1, 13.2, 13.3 each have an angular scanning arm 14.1, 14.2, 14.3 at the end of which there is provided a roller 2 which is rotatably mounted for the express purpose of providing low-friction scanning of the numerical value cams 11.1, 11.2, 11.3. The angular extension 1 of the scanning arms 14.1, 14.2, 14.3 serves as a limit stop element for the scanning of the digital position "0". Another extension arm 20.1, 20.2, 20.3 has been provided with several functional plateaus 15, 16, 21 arranged thereon. The functional plateaus 15, 16, 21 on the swivel levers 13.1, 13.2, 13.3 are designed as axially projecting ledges which are concentrically aligned with the shaft 5 which serves as a swivel axis therefor. The ledge which forms the functional plateau 15 is provided with an arc length corresponding analogously with the scanned values "9–1". The functional plateau 15 serves for a decade-by-decade control of the swivel levers 13.1, 13.2, 13.3 and any swivel lever which scans or senses a digit not equalling "0" will maintain all the other swivel levers 13.1, 13.2, 13.3 of the next lower decade off the scanning position and in a ready position. That is, it will prevent these levers from swiveling into the scanning position and will only allow scanning of the values of the next lower decade after it has itself entered a phase representing the zero value on the numerical value cam.

In order to effect decade-by-decade control of the swivel levers 13.1, 13.2, 13.3 bridge-shaped levers 17.1, 17.2, are provided having extension arms **17*a* and 17*b* which interact with the functional plateaus 15, 21 and 16 of two neighboring or adjacent decades, that is the extension arms 20.3 and 20.2. The levers 17.1 and 17.2 are rotatably mounted on a switching or cut-off shaft 19 and they are powered by a tension spring 23 in the clockwise direction. On the extension arm 17*a* of the levers 17.1, 17.2, there is arranged a scanning lug 24 which projects into the range of the ledges or functional plateaus 15 and 21**.

The sensing or scanning lug 24 abuts against the corresponding functional plateau 15 at the extension arm 20.3 or 20.2, respectively, under the torque of a tension spring 23 during the scanning phase of the cam 11.3 or 11.2, respectively. During transition of the scanned digit from "1" to the value "0" on the numerical value cam, the sensing lug 24 and thus the lever 17.2 or 17.1, respectively, will drop off over the end of the ledge of the functional plateau 15 and will come to rest on the ledge of the functional plateau 21 serving as a limit stop.

Figure 1B:
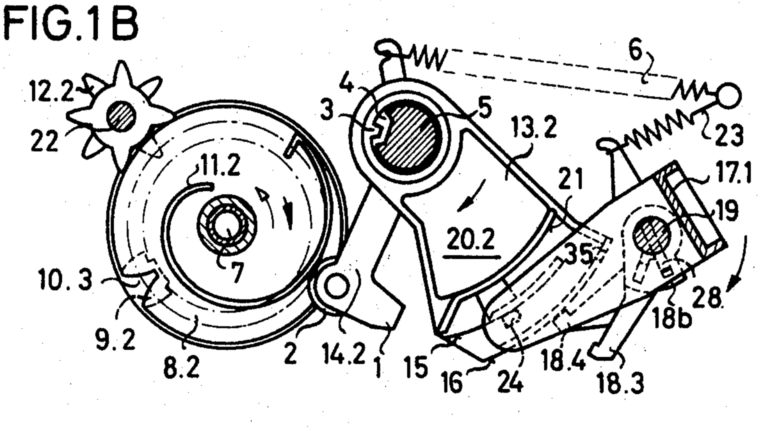
FIG. 1*b* is a schematic lateral view of a portion of the invention for the preselectable decade involving units of ten.
Figure 1C:
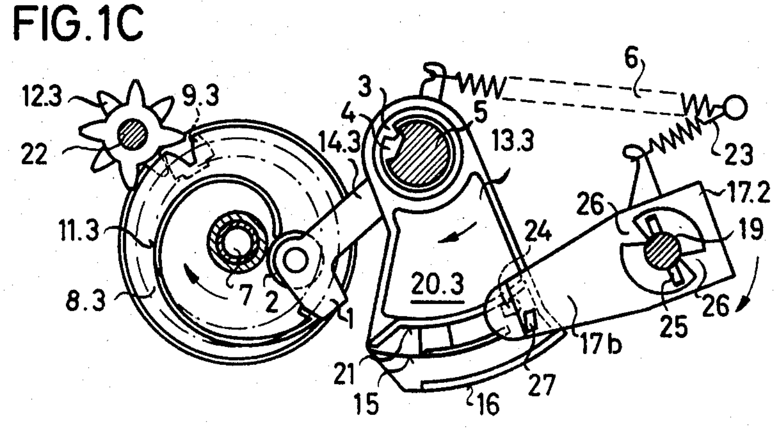
FIG. 1*c* is a schematic lateral view of a portion of the invention for the preselectable decade in units of hundreds.

Through operation of the cam controlled switching shaft 19 rotating in the counterclockwise direction, the levers 17.1 and 17.2 will also be transported into basic position by means of an engaging pin 25 in the shaft 19 and engaging cams 26 at the levers 17.1, 17.2 (see FIG. 1C). The second extension arm **17*b* of the levers 17.2, 17.1 is provided with a locking cam 27 projecting into the range of the functional plateau 16 peripherally arranged on the extension arm 20.1, 20.2 and, depending upon the scanning position of the scanning lug 24, the extension arm 17*b* is positioned in front of the ledge of the plateau 16** (FIG. 1A) or positioned in such a way that it releases the ledge (FIG. 1C).

Thus, whenever a value scanned on the number cam for any decade is less than "0", the corresponding scanning lug 24 will be lowered onto the ledge of the functional plateau 15 and will remain in that position until such time that the scanned digit "0" has been reached. Correspondingly, the locking cam 27 interposes itself forwardly of the ledge of the functional plateau 16 of the swivel lever of the next lower decade and thereby prevents inward swinging motion of the swivel lever into the scanning position. This reaction continues by means of the levers 17.2, 17.1 until the lowest decade has been reached. Inasmuch as only one swivel lever at a time will be in a sensing position, the apparatus operates in a very advantageous manner.

Finally, several stepped levers **18*a* and 18*b* are fixedly mounted on the switching shaft 19 with these levers interacting with the ledge of the peripheral functional plateau 16 at the swivel arms 13.1, 13.2, 13.3 and serving for a step-by-step control of the switching shaft to a closing or shut-off position. The stepped control of the switching shaft 19** is intended to achieve a reduction in amount of delivered flow shortly prior to attaining the preselected discharged amount by means of controlling a valve.

In accordance with the embodiment depicted, the two stepped levers **18*a* and 18*b* having a total of four switching arms 18.1, 18.2, 18.3, 18.4 in varying rotational angle positions are provided and in each case the two switching arms 18.4 and 18.3 of the stepped lever 18*b* interact with the swivel lever 13.2 for units of ten, with two additional switching arms 18.2 and 18.1 of the stepped lever 18*a* interacting with the swivel lever 13.1** for the decade of units of one.

The stepped levers **18*a* and 18*b* have been correspondingly arranged to be axially offset on the switching shaft 19 (FIG. 2). The varying rotational angular position is achieved by corresponding engagement of a safety pin 28 in the switching shaft 19. Within the entire switching path of the shaft 19 which is traversed it is possible to vary the switching travel of the individual switching steps by a corresponding arrangement of the switching arms 18.1, 18.2, 18.3, 18.4. Upon release of the preselected device into the counting process, the shaft 19 which is spring powered will rotate clockwise until the switching arm 18.4**, in accordance with the portion of the apparatus depicted in FIG. 1*b*, rests upon the functional plateau 16. The forces active from the switching shaft 19 through the switching arms 18.1, 18.2, 18.3, 18.4 onto the swivel levers 13.1, 13.2 are radially directed onto the shaft 5 and thus eliminate any torque acting upon the swivel levers 13.1 and 13.2. Accordingly, any retroactive influence emanating from the switching mechanism and acting onto the preselector mechanism will be eliminated.

The ledge forming the functional plateau 16 is formed with an arc length which analogously corresponds to the scannable valencies of the numbers "9–0". By removal of material at 34, 35, the functional plateau may be shortened to a selective length thereby permitting the switching position of the contacting arm 18.4, 18.3, 18.2, 18.1 to be determined for any value from "0–9" without additional devices or effort.

The functional process of scanning of one preselected value until the shut-off phase is reached will be described by assuming that the preselector mechanism has been set to a preselected value of "83", this value being demonstrated in FIG. 1*d* as displayed through a window 33 by means of number wheels 29, 30, 31 beneath a cover 32. The values indicated are transmitted by decade and prior to the counting process being set in by engageable and disengageable gear connections on the number wheels 10.1, 10.2, 10.3. Accordingly, the number wheel 10.1 with its cam 11.1 for the units of one will be set to "3" in accordance with FIG. 1A.

The number wheel 10.2 of the cam 11.2 for the units of 10 is set to the value "8" (see FIG. 1B).

Finally, the number wheel 10.3 with the cam 11.3 will show the position "0".

In the functional phase which follows, a switching mechanism releases the shaft 5 for one revolution in a clockwise direction so that the swivel levers 13.1, 13.2, 13.3, because of the trip cam 3 engaged in the slot 4, will be able by the force of the spring 6 to rotate freely and move into the scanning position. Thus, the swivel lever 13.3 will first move from its initial position to the sensing position "0" predetermined by the setting of the coordinated cam 11.3. This will cause the lever 17.2, which is set free by the clockwise rotation over a first rotational angular range of the switching shaft 19, to now be moved through the action of the tension spring 23 from an initial position into a sensing position at which it will be resting in contact on the ledge representing functional plateau 15. Since the swivel lever 13.3, because of the setting of the counter cam to "0", moves into its extreme sensing position taken in the clockwise direction, the sensing cam 24 on the lever 17.2 will drop off the functional plateau 15 and will rest upon the functional plateau 21. At the same time, the locking cam 27 arranged at the lever 17.2 disengages the swivel lever 13.2 of the next lower decade and releases the lever into sensing position, in accordance with the preselected value "8" on the counter cam 11.2 (see FIG. 1B).

However, since the swivel lever 13.2 is in a scanning position other than "0", the scanning lug 24 at the lever 17.1 rests upon the cooperating functional plateau 15 of the swivel lever 13.2 and by means of the locking cam 27 on the lever 17.1 it simultaneously locks the swivel lever 13.1 at the lowest decade (FIG. 1A) in its initial position.

The counting process is initiated in the above described setting phase. Drive is effected by means of the number wheel 10.1 representing the decade of units of one in the counterclockwise direction and is transmitted by means of switching cam plate 8.1 and switching pinion 12.1 on axle 22 onto the number wheel 10.2 in a manner which is known in the art. With progressive counting procedures, the swivel lever 13.2 arranged with the scanning position for the value "8", moves downwardly until it senses the value "8". Because of the declining tendency of the counting cam 11.2, the downward contact pressure of the swivel lever 13.2 generates a slight torsional force so that friction and drive between the parts of the swivel lever and the counter cam offset one another or influence each other in an advantageous manner.

Toward the termination of the counting process, the control of the switching shaft 19 to bring the shaft into the terminal shut-off position is accomplished by three reduction steps. The terminal shut-off position is effected by means of stepped levers **18*a* and 18*b* with the switching arms 18.4, 18.3, 18.2, 18.1 arranged in a staggered pattern in accordance with the rotational angular position, whereby the stepped levers are joined in a torsionally rigid manner with the switching shaft 19. In the embodiment disclosed and described, a determination is made of amounts yet to be delivered of for example "20", "10", "3" by means of a flow meter as the flow is reduced and as soon as the setting "0" is reached in the preselector mechanism, any flow will be completely and finally terminated. For this purpose, the switching arms 18.4, 18.3 have been arranged in the scanning range of the swivel lever 13.2 for the units of ten, and the swivel arms 18.2 and 18.1 are accordingly in the range of the swivel lever 13.1** for the units of one.

With rotation of the switching shaft 19 at the onset of the scanning phase, the precursing switching arm 18.4 moves in a clockwise direction and comes to rest on the functional plateau 16. The ledge representing the functional plateau 16 within the range of the switching arm 18.4, upon arriving at a position where the value "2" is sensed, drops off the shortened end of the functional plateau 16. The shaft 19 will now rotate clockwise until the switching arm 18.3 finally rests on the path allotted to it on the functional plateau 16. By means of the magnitude of the rotational angular distance from the next switching arm 18.3, the rate of flow reduction can be determined. In determining the switching position for the second reduction stage in a case where a residual "10" units of volume have yet to be delivered, the switching arm 18.3 will drop in accordance with the "0" setting as soon as the swivel lever 13.2 enters the scanning or sensing position. In the subsequent phase of operation, the switching arm 18.2 will be placed on the functional plateau 16 of the swivel lever 13.1 representing the units decade. In order to switch to the third reduction stage for a residual delivery of "3" units of volume, the functional plateau 16 for the switching arm 18.2 has been shortened by a value of three setting units. The switching lever 18.2 will drop as soon as the swivel lever has attained the scanning position "3". Finally, the switching arm 18.1 will be placed on the functional plateau 16 allotted thereto and upon reaching the "0" value position it will effect the final and terminal shut-off position by means of the swivel lever 13.1 (FIG. 3).

The terminal shut-off position will be attained once the switching arm 18.1 has dropped down from the functional plateau allotted thereto and by means of the residual rotational angular path it will attain the final terminal position. The location of the parts upon complete shut-off is depicted in FIG. 3.

It should be noted in connection with the foregoing disclosure that the representation of the embodiment of the present invention has been limited to one for three decades for reasons of simplicity of disclosure. It should be understood that the apparatus may be expanded to include any desired number of decades.

While a specific embodiment of the invention has been shown and described in detail to illustrate the application of the inventive principles, it will be understood that the invention may be embodied otherwise without departing from such principles.

What is claimed is:

1. Apparatus for scanning the relative position of a preselector counter mechanism including a plurality of digital discs having radial cams which are rotated in accordance with the setting of preselected numerical values on said counter, each of said radial cams being provided with a scanning arm adapted to initiate a switching operation upon reaching a preselected state of said counter mechanism, said apparatus comprising a plurality of counter wheels each adapted to be set to a preselected value, an analogue metering value cam affixed to each of said counter wheels, each of said counter wheels and metering value cams being arranged to represent a decade of a decimal system numerical value, indexing pinion means gearing each of said counter wheel and metering value cam with those representing a next adjacent decade, multiarmed spring actuated swivel levers for scanning said metering value cams by decades and in sequence after release from a ready position from a higher decade to a next lower decade, and a switching shaft having stepped levers thereon interacting with said swivel levers, said swivel levers having an extension operating as a scanning arm scanning said metering value cams and another extension arm provided with functional plateaus for effecting release by decades of said swivel lever into the scanning position, said another extension arm operating to release said stepped levers for effecting a stepped control function of said switching shaft.

2. Apparatus according to claim 1 further comprising bridging levers including extension arms adapted to interact with said functional plateaus of said swivel levers of two adjacent decades in such a way that said bridging levers operate to either lock or release the swivel lever of a next lower decade in response to the scanned position of said swivel levers.

3. Apparatus according to claim 1 wherein each of said swivel levers is formed with at least two functional plateaus arranged concentrically in relation to the swivel axis of said swivel levers and formed in the shape of axially protruding ledges, with one of said ledges representing one of said functional plateaus having an arc length corresponding to scanning numerical values 9 through 1 by means of which said swivel lever interacting with said bridging lever of a next lower decade may be moved from a ready position into a scanning position, with the other of said ledges representing a functional plateau having an arc length corresponding with a scanning angle of from 9 through 0, it being decade-dependent and serving for control of said stepped levers on said switching shaft.

4. Apparatus according to claim 1 wherein said metering value cams are formed in the shape of an Archimedean spiral, each of said counter wheels having a central bearing point with said metering value cams shaped with an inclination tending toward said central bearing point.

5. Apparatus according to claim 1 wherein each of said stepped levers are formed with at least two axially offset switching arms arranged in varying positions of angular rotation, said switching shaft being controlled within one decade across at least two steps.

6. Apparatus according to claim 3 wherein said ledge representing said functional plateau having an arc length for values 9 through 0 to be scanned is formed of a length such that with said functional plateau in a switching position for the corresponding stepped lever it can be selectively set for any of the values from 9 to 0.

7. Apparatus according to claim 6 wherein said ledges representing said functional plateaus are arranged on said swivel levers at radial distances with one of said ledges representing a functional plateau interacting with said stepped levers and with another of said ledges offset inwardly taken radially of said swivel levers with the functional plateau represented by said ledge serving to control said bridging levers between decades.

* * * * *